Dec. 21, 1926.                                                         1,611,630
                              J. P. BURKE
                             WORM GEARING
                         Filed March 30, 1925

INVENTOR
J. P. Burke
BY Geo. L. Beeler
ATTORNEY

Patented Dec. 21, 1926.

1,611,630

UNITED STATES PATENT OFFICE.

JAMES P. BURKE, OF NEWARK, NEW JERSEY, ASSIGNOR TO JAMES E. ENGLISH, OF NEWARK, NEW JERSEY.

WORM GEARING.

Application filed March 30, 1925. Serial No. 19,262.

This invention relates to mechanical movements and more particularly to speed reduction and power transmission devices.

Among the objects of this invention is to provide means for the transmission of power between a plurality of co-axial shafts operating at different speeds, said means comprising a novel and highly simplified gear arrangement requiring a minimum number of parts or elements and providing for transmission of power in any predetermined direction as desired.

Another object of this invention is to provide gear structures of a highly simplified nature adapted for large scale quantity production and particularly for a high reduction or variation of speed as between different moving parts.

With the foregoing and other objects in view the invention consists in the combination and arrangement of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1:
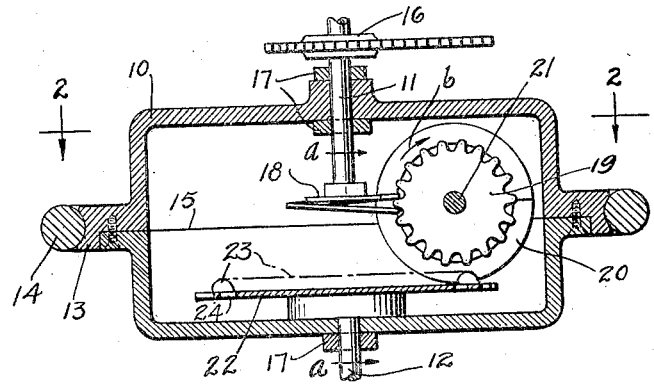
Figure 1 is a sectional view on the line 1—1 of Fig. 2 showing a suitable structure.
Figure 2:
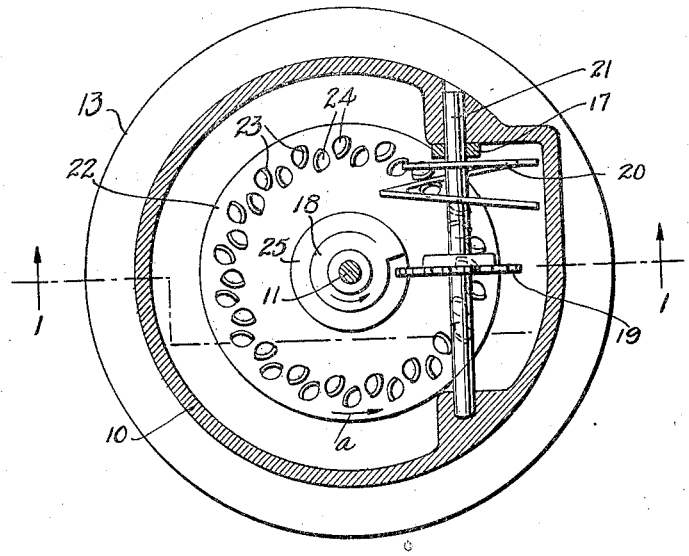
Fig. 2 is a sectional view on the line 2—2 of Fig. 1.
Figure 3:
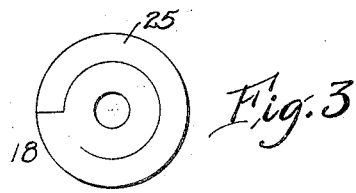
Fig. 3 is a detail plan view of a power transmission member or worm.

Referring now more particularly to the drawings, 10 represents a supporting structure or casing which is arranged so as to subserve the needs of the particular installation or use to which the invention is put. I may, however, arrange said casing to be movable as desired and preferably in conjunction with suitable brake mechanism to vary or otherwise control the movement or rotation of said casing, whether caused by the transmission of power between a plurality of co-axial shafts 11 and 12 mounted thereon or by other means so as to afford a maximum adaptability of the device for varying conditions. More specifically, said casing may consist of a cylindrical body or have a circular portion 13 to receive a brake shoe 14. Said casing may be split along the line 15 transversely to the axis thereof to permit of easy assemblage of the device therein, said parts being securely fastened together in a suitable manner, one of them being arranged to carry the shaft 11 while the other carries the shaft 12, said shafts lying in coaxial relation to the circular portion of the casing.

The shafts 11 and 12 operate at different speeds to transmit power as from a motor or other high speed appliance or actuating means to the point or device where power at low speed is desired. Thus the shaft 11 may be thought of as a high speed shaft, and the shaft 12 as a low speed shaft, a sprocket wheel 16 being shown for convenience as mounted upon the high speed shaft. Said shafts are secured to said casing against movement longitudinally of the axis by means of the collars 17 or the like.

A power transmission member 18 is mounted upon the shaft 11, said member taking the form of a worm gear or cam and arranged to co-operate or mesh with a gear 19. The gear 19 is mounted in suitable position relatively to the member 18 and preferably in a plane passing through the axis of said member. The gear 19 thence transmits its power to a co-operating member or power transmission device which may be in the form of a cam or worm 20 as by means of the shaft 21 whereon it is mounted coaxially with the gear 19. The member 20 then transmits its power to a gear 22 which is mounted upon the low speed shaft 12 to rotate the same. The specific form of the power transmission members may be varied as desired in the commercial application of the invention, and according to the degree of speed required and the measure of the power to be transmitted. The invention is specially adapted for very high speed reduction, the members 18 and 20 being arranged as worms or cams of relatively low pitch, or as shown to rotate their co-operating gears but one tooth for a full rotation of said members. The member 20 is offset from the parallel axial plane of the gear 22 so as to clear the adjacent parts of the device, said gear being made of sufficient size to engage said offset member, the teeth upon said gear being formed to provide for suitable and easy meshing engagement with the member.

More specifically, the gears 19 and 22 may be thought of as being formed of sheet material as by stamping, the latter gear having its teeth 23 extending perpendicularly of the plane of the gear, said teeth being formed by striking the lugs or extensions from the face of the gear, leaving the holes 24. Thus these teeth are formed in a series of pairs of lugs, the lugs of each tooth being in spaced relation to each other to provide for the reception of a worm tooth between the lugs. The lugs of each tooth are preferably convexed toward each other to provide most suitable operating conditions and with a minimum degree of friction. The members 18 and 20 are likewise constructed of sheet metal, a wing or tooth portion 25 being formed along the periphery thereof which is gradually offset at a uniformly varying angle or pitch from the plane of the member to be adapted to actuate a gear which meshes directly therewith. Obviously the pitch of said tooth may be varied to suit the particular operating conditions. Thus it is seen that a power transmission and reduction device is provided, the members whereof being formed wholly of sheet material and in a very inexpensive manner. It will be noted likewise that the direction of rotation of the low speed shaft relatively to the high speed shaft may be in the same or in an opposite direction, depending upon the direction of inclination or advance of the worm teeth or spirals. Thus, assuming the direction of the high speed shaft to be as indicated by the arrow $a$, a motion in the direction of arrow $b$ is imparted to the gear 19 and finally a rotation of the low speed shaft is caused in the same direction as the high speed shaft. But if the direction of advance of the tooth on the member 18 were reversed, the direction of rotation between said shafts would be opposite.

This invention thus provides for the transmission of power between shafts which due to peculiar operating conditions must be in alinement with each other, and comprises a third shaft mounted transversely to the other shafts and carrying means engaging directly the gears or power transmission members carried by the first mentioned shafts to permit of a reduction of speed therebetween. Said members are to be understood as being generally in the form of worm members and the like, this term being used to designate structures which are of generally similar form.

I claim:

1. In power transmission mechanism, the combination with a low speed shaft, a gear thereon, a relatively high speed shaft coaxial therewith, and a gear thereon of means for transmitting power from the gear on, one of said shafts to the gear on, the other, a housing for said mechanism rotatable about the axis of said shafts, said means comprising a pair of spaced coaxial gear members meshing respectively with the aforesaid gears and mounted on an axis in fixed relation to the housing so as to exert a torque thereon as a result of the action of the shafts, and a brake to control the rate of rotation of said housing to vary the speed reduction between the shafts.

2. In power transmission mechanism, the combination with a low speed shaft and a relatively high speed shaft mounted coaxially therewith, of means for transmitting power from one of said shafts to the other, said means comprising a worm upon the high speed shaft, a gear upon the low speed shaft, a gear mounted transversely to the axis of said shafts and meshing with said worm, and another worm mounted transversely to said axis and arranged to mesh with the gear on the low speed shaft, means being provided between the transversely mounted members for transmitting power from one to the other, a housing being provided for said mechanism to carry the transversely mounted gears, said housing being rotatable about the axis of said shafts, and brake means to control the rate of rotation of said housing to vary the speed reduction between said shafts.

In testimony whereof I affix my signature.

JAMES P. BURKE.